Figure 1:
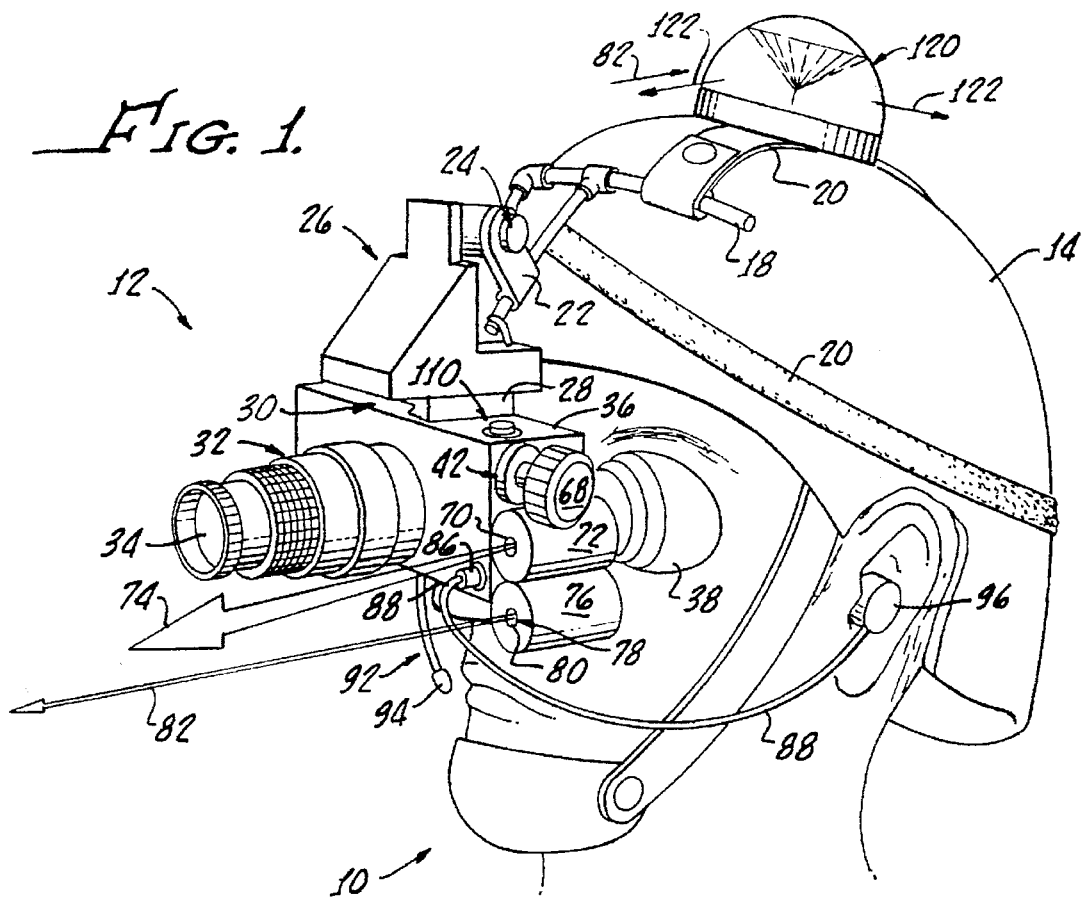

United States Patent [19]
Owen

[11] Patent Number: 5,648,862
[45] Date of Patent: Jul. 15, 1997

[54] NIGHT VISION DEVICE WITH AUDIO COMMUNICATION AND IDENTIFICATION FACILITY

[75] Inventor: Larry D. Owen, Phoenix, Ariz.

[73] Assignee: Litton Systems, Inc., Woodland Hills, Calif.

[21] Appl. No.: 281,442

[22] Filed: Jul. 27, 1994

[51] Int. Cl.$^6$ ................................................ H04B 10/00
[52] U.S. Cl. .......................... 359/153; 359/172; 342/45
[58] Field of Search ................................ 359/152, 159, 359/169, 170, 172; 342/45

[56] References Cited

U.S. PATENT DOCUMENTS

| | | | |
|---|---|---|---|
| 4,603,975 | 8/1986 | Cinzori | 359/159 |
| 4,605,959 | 8/1986 | Colbaugh | 359/159 |
| 4,648,131 | 3/1987 | Kawaguchi et al. | 359/172 |
| 4,703,879 | 11/1987 | Kastendieck et al. | 224/181 |
| 4,884,137 | 11/1989 | Hanson et al. | 359/159 |
| 4,970,589 | 11/1990 | Hanson et al. | 359/159 |
| 5,299,227 | 3/1994 | Rose | 342/45 |
| 5,349,179 | 9/1994 | Morley | 250/214 VT |
| 5,455,702 | 10/1995 | Reed et al. | 359/152 |

OTHER PUBLICATIONS

Light Beam Communications, Popular Electronics Feb. 1974 pp. 52–54.

*Primary Examiner*—Wellington Chin
*Assistant Examiner*—Rafael Bacares
*Attorney, Agent, or Firm*—Oppenheimer Poms Smith

[57] ABSTRACT

A night vision device includes an image intensifier tube for providing an intensified image of a dim or night-time scene. The night vision device also includes provision for full duplex transmission and receipt of voice audio between the user of the device and another person who is using a substantially identical device. Another provision of the device is for interrogating IFF (identify friend or foe) units worn by other personnel. The IFF units have provision for receiving a beamed interrogation signal and for transmitting a coded identification signal in response. Thus, a user of the night vision device can identify friendly personnel at a distance, as well as communicating by voice with others who are using similar night vision devices so equipped.

17 Claims, 3 Drawing Sheets

NIGHT VISION DEVICE WITH AUDIO COMMUNICATION AND IDENTIFICATION FACILITY

BACKGROUND OF THE INVENTION

1. Field of the Invention

The present invention is in the field of night vision devices. More particularly, the present invention relates to a night vision device which includes provision for secure audio communication, and may also include provision for identifying friendly personnel (IFF).

2. Related Technology

The present night vision devices include both goggle and monocular types which may attach to a support structure carried by a face mask or by a helmet, as well as comparatively small hand-held "pocket scope" types of night vision devices, and comparatively larger weapon-mounted night vision sights. As thus supported in front of a user's face and eyes in front of at least one eye of the user, the night vision device provides an intensified image of a night-time scene. An objective lens or lens system directs light from the night scene, which is too dim to be viewed with natural vision, onto an image intensifier tube. The image intensifier tube effects an amplification of available light and also, in effect, shifts the frequency of invisible infrared light into the visible spectrum. An eyepiece lens or lens system presents the image for viewing by a user of the device. Thus, the image intensifier tube provides a visible image which replicates the dim or invisible infrared image entering the device via the objective lens. Infrared light is rich in the night-time sky, so that a user of a night vision device can see without artificial illumination. The night vision weapon sights also incorporate an aiming reticle for use in sighting the weapon at a target.

The night vision devices which are supported from the user's head it may be used by the wearer of the helmet or face mask to view a night-time scene while the user's hands remain free. Many of these night vision devices include an infrared LED or laser diode lamp which forwardly projects a cone of invisible infrared light. This light is not visible to the unaided eye, but will provide an image through the night vision device. This invisible infrared light may be used, for example, for covert signaling to other personnel who are also equipped with night vision devices. The infrared light may alternatively be used like a flash light in extremely dark conditions for illumination of a limited area around the user without the aid of visible light. Such use allows the user to move about, to read a street sign or a map, for example, and to perform other activities without the use of visible light.

A conventional night vision device is known as the AN/PVS-7B. This night vision device includes a housing with a single objective lens through which is received low-level light from a night-time or other scene illuminated by light too dim to be viewed with the unaided eyes. The housing of the conventional AN/PVS-7B also included an image intensifier tube which provides an image in phosphor green light replicative of the dim scene viewed through the single objective lens. An image splitter, and a pair of eye pieces allow the user of the device to view the full intensified image with each eye.

The conventional AN/PVS-7B also includes a small infrared lamp, the light from which is not visible with the unaided eye, but which will provide an image through the night vision device. This lamp may be switched on for area illumination, for example, in an area where natural or other low-level lighting is nonexistent or is too dim for the night vision device to provide an image. Such area illumination with infrared light may be required, for example, in a building basement or in a tunnel where natural light can not reach, and where artificial illumination visible with the unaided eyes is not available or is not desirable. This small infrared spot light of the conventional night vision devices, such as the AN/PVS-7B, is also useful for such purposes as map or sign reading in circumstances where visible illumination would be undesirable. Covert signaling with the infrared lamp to others who are also equipped with night vision devices is facilitated by a momentary contact switch for this lamp.

However, the increasing availability and presence of night vision devices increases the risk that such supposedly covert signalling using the relatively broad angle infrared beam of conventional night vision devices will be observed by hostile personnel. Further, recent experience has shown that radio communications are increasingly subject to interception. Even those radio communications which are encoded or scrambled are subject to possible code breaking or de-scrambling. Radio transmissions can also reveal the location of the transmitter to unfriendly personnel. Still further, the rapid pace of action and lethality of modern weapons systems in armed conflicts has highlighted the need to quickly identify friendly personnel so that injuries and fatalities do not result from so called "friendly fire".

SUMMARY OF THE INVENTION

In view of the deficiencies of the conventional technology, an object for the present invention is to avoid one or more of these deficiencies.

More particularly, an object for the present invention is to provide a night vision device with a facility for two-way audio communication.

Still more particularly, an object of this invention is to allow the facility for two-way communication to be used as an IFF system to identify friendly personnel who are equipped with an IFF transponder, even though these personnel may not be equipped with or using night vision devices.

Accordingly, the present invention according to one aspect provides a night vision device which includes an audio communication facility. The audio communication facility is implemented by providing a low-power narrow-beam infrared spot light on the night vision device, and provision for modulating or digitally encoding speech from the user of the device onto the infrared beam. The image intensifier tube of the device may be provided with an electrical interface to a demodulator or decoder, which provided audio output to an earphone or helmet speaker worn by the user of the device. Alternatively, another receiver for an infrared communication beam from another night vision device may be provided. This alternative receiver may take the form of a diverter mirror or prism, and an infrared transducer converting the received infrared beam to an electrical signal which is demodulated or decoded and amplified for audio perception by a user of the device. Thus, personnel equipped with the devices may communicate securely with one another over a considerable distance at night with out the use of radio transmissions.

More particularly, the present invention provides according to one aspect, a night vision device comprising an image intensifier for receiving low-level light from a scene and providing a visible image replicating the scene; and receiver means for receiving a light beam carrying non-image information, and for providing an output response thereto.

Further, the present invention provides according to another aspect an identify-friend-or-foe (IFF) capability. The IFF capability is implemented by providing an encoded interrogation capability in the narrow beam spotlight (i.e., an interrogation code modulated or encoded onto the infrared beam), and providing friendly personnel with an omnidirectional transponder (i.e., a receiver and transmitter combination), which transponder will respond to the interrogation signal from a night vision device with an appropriate identification code. The image intensifier tube of the night vision device, through its interface with the audio output circuitry is also provided with a decoding facility which will provide the user of the device with an auditory identification signal (i.e., a coded series of beeps in the earphone, for example) when friendly personnel are interrogated with the night vision device. Alternatively, a visible response, such as illumination of an LED visible through the eyepiece of the night vision device may be used to identify friendly personnel. Accordingly, injury or fatalities to friendly personnel in night time operations can be reduced or substantially eliminated.

That is, according to another aspect of the present invention an IFF (identify friend or foe) unit is provided, the IFF unit comprising a housing adapted to be externally mounted or carried upon one of: a structure, a vehicle, or upon a person; a receiver for receiving a light beam carrying a modulated or digitally encoded interrogation signal and responsively providing an electrical first output response; a decoder receiving the electrical first output response and responsively providing an electrical second output response; an encoder receiving the electrical second output response and responsively providing a modulated or digitally encoded third electrical output response, means for generating an invisible infrared light beam, and a driver receiving the third electrical output response and driving the means for generating the invisible infrared beam to modulate or encode the third electrical output response on the light beam, and an omni-directional reflector receiving the modulated or encoded light beam and dividing the beam into a plurality of sub-beams each having a different direction away from the IFF unit.

Additional objects and advantages of the present invention will be apparent from a reading of the following detailed description of preferred exemplary embodiments of the invention, taken in conjunction with the appended drawing Figures, which are briefly described below.

BRIEF DESCRIPTION OF THE DRAWING FIGURES

Figure 7:
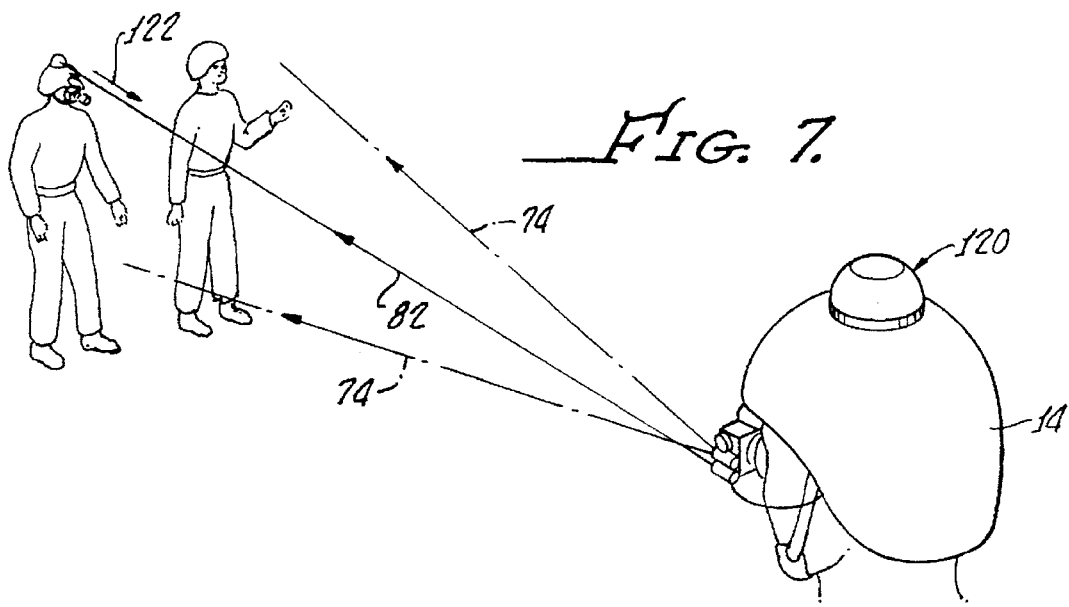
Figure 2:
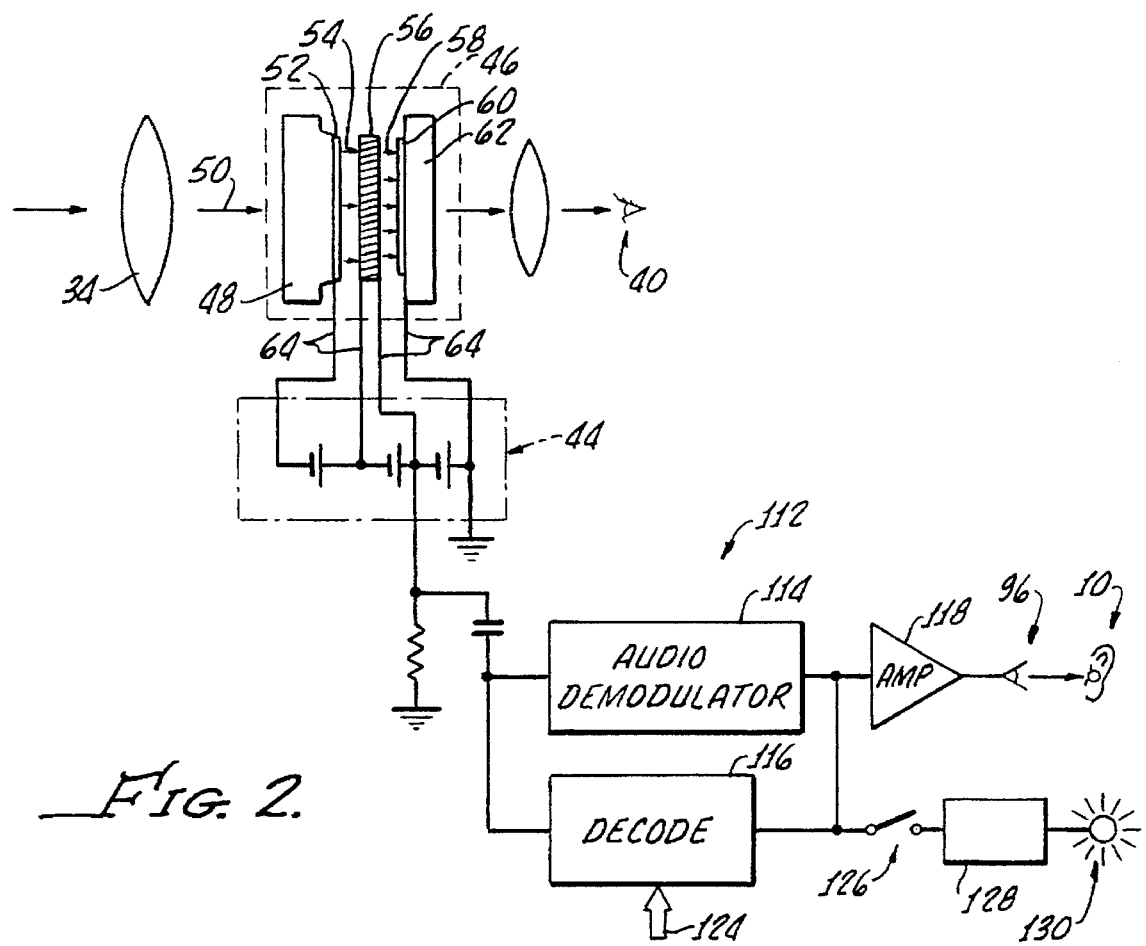
Figure 3:
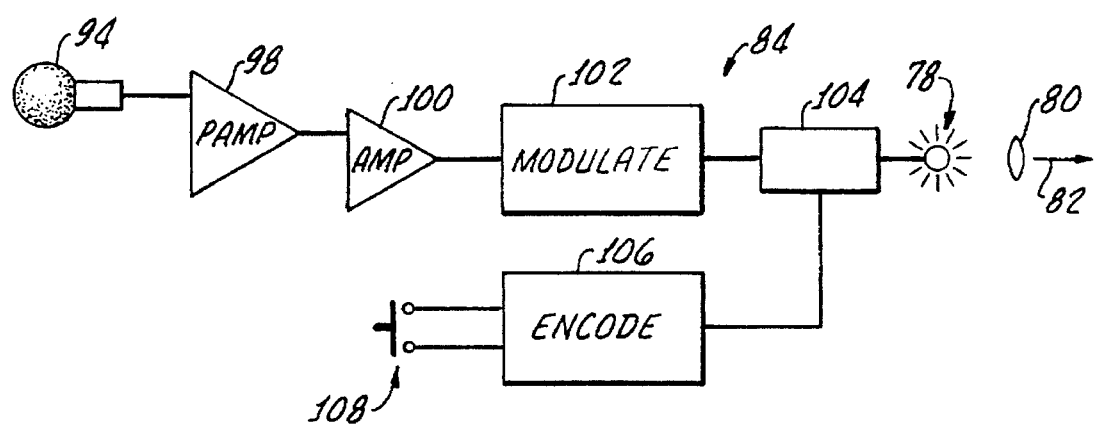
Figure 4:
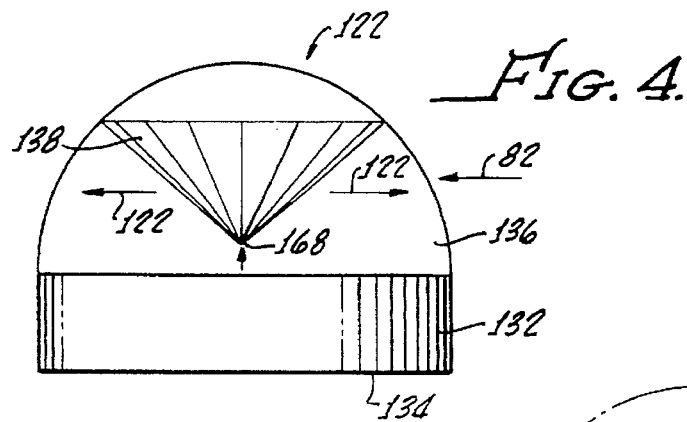
Figure 5:
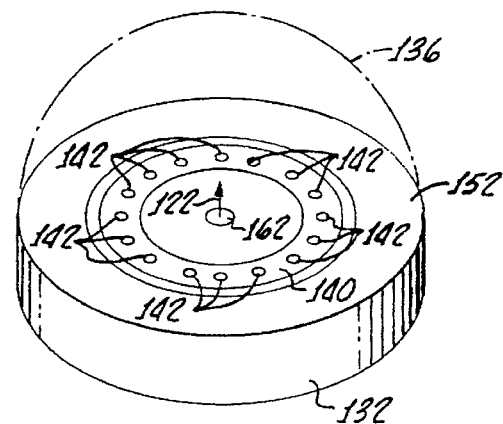
Figure 6:
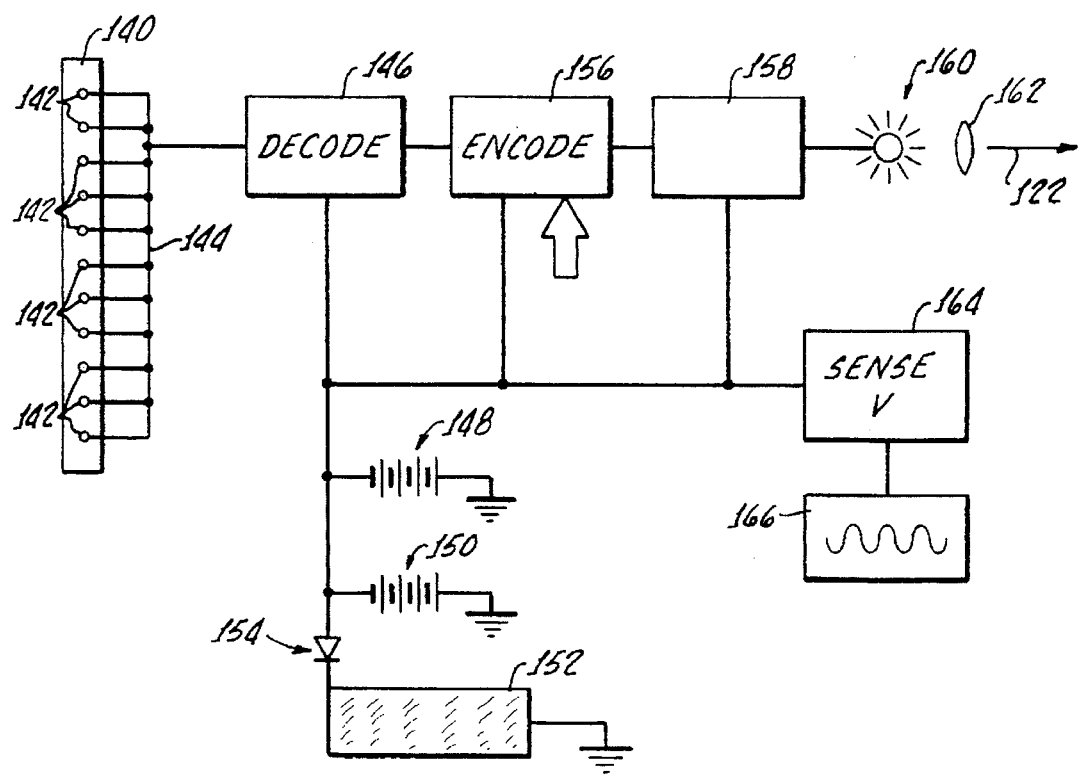

FIG. 1 provides a fragmentary perspective view of a user wearing a helmet carrying a support structure upon which is supported both a night vision device embodying the present invention, and an IFF unit according to the present invention; and in which a portion of the helmet is broken away for clarity of illustration;

FIG. 2 is a schematic illustration of a portion of the night vision device seen in FIG. 1;

FIG. 3 provides another schematic illustration of a portion of the night vision device seen in FIG. 1;

FIG. 4 is a side elevation view of the IFF unit seen atop the user's helmet in FIG. 1;

FIG. 5 provides a fragmentary perspective view of the IFF unit seen in FIGS. 1 and 4, and with a portion of the unit broken away or shown in dashed lines for clarity of illustration;

FIG. 6 provides a schematic illustration of a portion of the IFF unit seen in FIGS. 1, 4, and 5;

FIG. 7 illustrates eye-to-eye, line of sight non-image communication between two users of night vision devices according to the present invention.

DESCRIPTION OF THE EXEMPLARY PREFERRED EMBODIMENTS

Referring first to FIG. 1, an operator 10 is shown using a night vision system, which is generally indicated with the numeral 12. In order to support the night vision system 12 from the operator's head, a helmet 14 worn by the operator 10 carries a support structure portion 16. This support structure portion 16 includes a frame 18 secured to the helmet 14 with various straps 20, and having a forwardly and upwardly extending clevis 22. The clevis 22 carries a hinge pin 24 about which is pivotally supported a flip up mount portion 26 of the support structure portion 16. Consequently, the flip up mount portion 26 of the support structure 16 is hinged on the clevis 22 for pivotal movement about hinge pin 24. This flip up mount portion 26 carries a carriage 28 and a coupling device 30. A night vision device or viewer 32 is suspended from the support structure 16 at the coupling device 30. This night vision device 32 is of goggle configuration, and includes a single objective lens 34 admitting light from a dimly lighted or night time scene, a housing 36, and a pair of eye pieces 38 aligned with respective eyes of the operator 10. An eye of the operator 10 is schematically indicated in FIG. 2 with the numeral 40. To use the night vision viewer 32, the operator 10 places it in the use position depicted in FIG. 1, turns the viewer 32 on by use of a multi-function control switch 42, which will be further explained, and looks into eye pieces 38 to see an enhanced image representative of the dimly-lighted scene, light from which has entered objective lens 34.

Viewing now FIGS. 1 and 2 in conjunction with one another, the night vision viewer 32 includes a power supply in the form of an internal battery pack (not visible in the drawing Figures). Internally of the night vision viewer a power supply circuit, schematically indicated with the numeral 44 provides high voltage power to an image intensifier tube. This image intensifier tube is schematically referenced with the numeral 46, and supplies to the eye pieces 38 an intensified image of the scene viewed through the objective lens 34 in phosphor yellow-green light. The image intensifier tube 46 includes an input window 48 through which is focused light (arrow 50) transmitted via the objective lens 34. Associated with this input window 48 is a photocathode 52 which responds to the light photons by emitting electrons, indicated with the arrow 54. The electrons 54 travel under the influence of the applied potential from power supply 44 to a microchannel plate, which is indicated with the numeral 56. Microchannel plate 56 includes a multitude of microchannels (indicated on FIG. 2 by the angulated lines across the plate 56), the interior surfaces of which are coated with or formed by a material which is a good emitter of secondary electrons.

Consequently, the photoelectrons entering the microchannel plate 56 from photocathode 52 cause the secondary emission of a proportionate number of secondary emission electrons (indicated with arrows 58) in a pattern replicating the image received via objective lens 34. This shower of secondary emission electrons 58 is directed onto a phosphorescent screen 60 to provide a visible mosaic image in yellow-green light replicating the invisible or dim image viewed through the objective lens 34. An output window 62 is associated with the phosphorescent screen 60 to transmit the visible image outwardly of the image intensifier tube 46 to the operator 10. As can be seen viewing FIG. 2, each of the photocathode 52, the microchannel plate 56 at each of its opposite faces, and the phosphor screen 60 have individual electrical connection and differing electrical potentials applied thereto from the power supply 44 via conductors generally referenced with the numeral 64.

Viewing once again FIG. 1, it is seen that the night vision viewer 32 includes a dual-function control switch 66, having a control shaft (not visible in the drawing Figures) extending outwardly of the housing 36, and carrying an external control knob 68. This control knob 68 is visible on the outside of the housing 36. The control switch 66 is effective to switch on and off the night vision viewer 32, and is also effective in response to selected movements of the control knob 68 to turn on and off an infrared LED lamp or spot light, generally indicated with the numeral 70. The spot light 70 is carried in a boss 72 of the housing 36 below the control knob 68. Viewing FIG. 1, it is seen that the spot light 70 provides a relatively broad-angle cone of infrared light (arrows 74), and is usable for area illumination and covert light-blink signaling as was described above.

However, the housing 36 includes another similar boss 76 disposed adjacent to the boss 72, which carries a narrow-beam infrared light source 78. Preferably, the light source 78 includes an infrared LED and a focusing lens (schematically indicated on FIG. 2, and referenced with the numeral 82) or an infrared laser light emitting diode, which inherently provides a narrow beam of infrared light. This narrow infrared light beam is indicated on FIGS. 1 and 2 with the numeral 82. Preferably, the switch 42 includes another switch position which is accessed by manipulation of the knob 44, in which an audio communication and IFF (identify friend or foe) function of the night vision viewer 32 is activated.

Recalling the description above of how invisible illumination can be provided for the user of the night vision viewer by use of the infrared spot light, and recalling that the user can see the illumination provided by the broad-angle beam 74 in his field of view, it will be understood that the user can also see illumination from the beam 82 on his field of view. That is, the narrow beam 82 is directed to be generally centrally located in the user's field of view at a distance forwardly of the user 10. In order to provide full duplex communication for the user 10 with others who are similarly equipped, the night vision viewer 32 includes provision for modulating or encoding speech from the user on the beam 82, and for receiving and demodulating or decoding speech from another user whose return beam 82 is shining to the user 10. This concept of eye-to-eye audio communication over a considerable distance between two users of night vision devices 32 is represented on FIG. 7 by the second distant user 10' who has a line of sight confronting relationship with the user 10. Each of the users 10 and 10' holds the other in the narrow angle beam 82 from their respective night vision devices 32. Each of the users 10 and 10' can see the other illuminated with the infrared beam 82 from their own night vision device 32.

FIG. 1 shows that the viewer 32 includes a miniature phono jack, indicated with the arrowed reference numeral 86. This phono jack 86 allows the connection of a head set 90 via a cable 88, which at a distal end thereof including a male phono plug 90. The headset 90 includes a voice-activated microphone 94, and an ear phone 96.

FIG. 3 shows that the night vision device 32 includes a transmitter section, generally indicated with the numeral 84. This transmitter portion 82' includes a preamplifier 98 receiving an audio signal input from the microphone 94. The preamplifier 98 provides an amplified audio signal to amplifier 100, which further amplifies the input signal from preamplifier 98, and feeds the resulting higher-level signal into a modulator circuit 102. The amplifier 100 may also include frequency filters to, for example, enhance intelligibility or clarity of speech communication via the night vision devices 32. A modulated signal from modulator circuit 102 feeds into a driver circuit 104 for the LED 78. Because of the modulated input to the LED 78 from the driver circuit 104, the beam 82 provided by this LED is modulated according to the audio input from the user 10 to microphone 94. It will be understood that the modulator circuit 102 may be arranged to use amplitude modulation, frequency modulation, digital encoding, or any other desired method of providing a time-variant analog of the speech of user 10 on the beam 82. Amplifier 100 or modulator 102 may also include provision to encrypt or scramble the drive signal to LED 78 so that the beam 82 will not provide open communication to others who may be equipped with interception devices capable of receiving the infrared beam 82.

FIG. 3 also shows that the transmitter section 84 includes an interrogation encoder 106, which is controlled by a momentary-contact switch 108. The switch 108 is closed by actuation of a push button 110 seen on the exterior of housing 36 in FIG. 1. When the operator 10 actuates push button 110 to momentarily close switch 108, the interrogation encoder circuit 106 provides a selected code, which may be a tone code or a digital code, for example, to the LED driver 104. This code then appears on the beam 82 transmitted by the LED 78. The use of this interrogation code transmission aspect of the night vision viewer 32 will be explained below in connection with the IFF facet of the present invention.

Viewing FIG. 2 once again, it is seen that the night vision device 32 includes a receiver section, generally referenced with the numeral 112. The detector for this receiver section is preferably the image intensifier tube 46. That is, the image intensifier tube 46 has a broad spectrum response to visible light in the far red end of the spectrum, as well as to invisible light in the infrared region of the spectrum. This visible and invisible light causes an electrical response in the photocathode 52 (i.e., emission of photoelectrons 54). Further, the image intensifier tube 46 provides a high degree of amplification of this electrical response (i.e., the shower 58 of secondary emission electrons). This electrical response and amplification of the tube 46 can be used to detect a modulated or encoded signal in the light entering the objective lens 34. However, it should be noted that the detector for the receiver section 112 can also be separate from the image intensifier tube 46. For example, the detector can be defined by a photodiode or photo transistor (not shown) which is responsive to the infrared light beam 82. Such a separate detector may have its own objective lens, or could be disposed along a branch optical path leading from the objective lens 34. This branch optical path could use a dichroic mirror or prism set to separate the light signal fed to the detector from that which is allowed to pass the image intensifier tube 46.

In the preferred embodiment depicted in FIGS. 1 and 2, the electrical interface with the image intensifier tube 46 is effected at the conductor 64 having connection with the output of the microchannel plate 56. At this point in the electrical circuit of the image intensifier tube 46, the signal strength of the incoming modulated signal has benefitted from the high level of amplification provided by the microchannel plate 56. That is, the image intensifier tube 46 serves not only as a detector for the receiver section 112, but also as a first amplifier for this signal. The electrical signal from the image intensifier tube 46 is provided to an audio demodulator circuit 114, and to a decoder circuit 116. Again the function of the decoder circuit 116 will be described in connection with the IFF aspect of the present invention.

Audio demodulator circuit 114 provides an output signal to an amplifier 118 driving the earphone 96. Thus, returning to a consideration of FIG. 7, when the users 10 and 10' speak into their respective microphones 94, the audio signal is modulated or encoded upon their respective narrow-angle illumination beams 82 by the transmitter section 84, and is transmitted to the other user. The receiver section 112 of each user's night vision device 32 receives the illumination beam 82 and provides audio 35 output to the user 10 or 10' replicating the speech of the transmitting user. The users 10 and 10' enjoy full duplex speech communication. Further, because of the narrow-angle nature of the beams 82, and the fact that each user 10 can see what is illuminated by this beam, the communication between the users 10 and 10' is very secure, and not likely to reveal their existence or location to others. Even others with night vision devices who could see the infrared beam if it were directed toward them are not likely to become aware of the beams 82 because these beams are of low power and are very directional.

Recalling that which has been described above and which is depicted in FIGS. 1–3, and 7, attention now is directed additionally to FIGS. 4–6. FIG. 1 shows that the user 10 has upon the helmet 14 a generally dome-shaped IFF unit 120. The IFF unit 120 is responsive to the interrogation code transmitted by another user of a night vision device 32 to transmit an identification code on an infrared beam, indicated on FIGS. 1 and 4 with the arrow 122. That is, if the user 10 is in the beam 82 of another who transmits an interrogation code, the IFF unit 120 responds with a multi-directional transmission of an infrared beam 122, which is encoded with a selected and variable identification code. This identification code is detected by the decoder 116 of the night vision device 32, which provides an identification signal input to the amplifier 118, recalling FIG. 2. The identification signal may be a beep, for example, which is heard by the interrogating user 10 in earphone 96. Viewing FIG. 1, it is seen that the appropriate identification code may be selected by an input (indicated with arrow 124) to the decoder 116. The input 124 may be provided to the decoder 116 in the form of a digital code set on a DIP switch, for example. Thus, this code may be changed on a hourly or daily basis, if desired, to insure the authenticity of received identification codes.

Still viewing FIG. 1, it is seen that the night vision device 32 includes a switch 126 which is held open by the phono plug 90 in phono jack 86. When the phono plug 90 is removed from phono jack 86, perhaps because the night vision device 32 is being used merely in a surveillance mode and is not being used to effect audio communication with others, the switch 126 closes automatically. In this event, when an authentic identification code is received via the receiver section 112, the output from decoder 116 drives an LED driver circuit 128 to briefly flash a LED 130. The LED 130 is disposed within the night vision device 32, but is visible through the eyepieces 38. Consequently, the device 32 can be used for IFF purposes even when an audio communication facility of the device is not in use.

Turning now more particularly to FIG. 4–6, it is seen that the IFF unit 120 includes a generally dome-shaped housing 132, having a lower surface 134 at which the unit is attached to helmet 14. An upper dome portion 136 of the IFF unit 120 is transparent, and supports a depending multi-faceted conical reflector 138. Within the dome 136, the IFF unit 120 includes an annular receiver unit 140, which includes a number of discreet infrared-sensitive detectors 142. The detectors 142 may be, for example, photo diodes or photo transistors which are responsive to infrared radiation. The annular receiver unit 140 and detectors 142 are congruently below the reflector 138 in plan view. Consequently, the interrogation signal on beam 82 causes a response from the detectors 142. Viewing FIG. 6, the annular receiver 140 and detectors 142 are shown straightened out rather than in an annular configuration. The detectors 142 each provide an output to a common conductor 144 connecting into a decoder 146. As a result, no matter which direction (in azimuth) the interrogation beam 82 arrives from, one or more of the detectors 142 provide an 35 electrical response to the conductor 144 and decoder 146.

Decoder 146 is powered by a disposable and replaceable battery 148 received within the housing 132. Also sharing in powering the decoder 146 is a rechargeable battery 150, and a solar cell 152. The solar cell 152 is connected to the battery 150 via a diode 154 so that the cell 152 does not represent a discharge path for the batteries 148 and 150 when it is not sufficiently illuminated by sun light to serve as a voltage and current source. Viewing FIG. 5, it is seen that the solar cell 152 is of annular configuration, and is not congruent with the reflector 138 in plan view of the unit 120. That is, in plan view of the unit 120, all or a substantial part of the solar cell 152 is radially outside of the circular shape of the reflector 138 in plan view so that sun light from overhead will illuminate a substantial portion of the solar cell 152. The batteries 148, 150, and solar cell 152 also provide power to an encoder 152, an LED driver 158, and a shaker 166, the functions of which will be further described.

When the decoder 146 receives an interrogation signal, it provides an output response to an encoder 156. The encoder 156 provides a selected modulating or encoding identification code to the driver circuit 158, which drives and modulates an LED 160. The LED 160 transmits a modulated or encoded light signal via a lens 162, which light signal becomes the identification signal 122. Viewing FIGS. 4 and 5, it is seen that the LED 160 and lens 162 are centrally located below the apex 168 of the conical reflector 138. The beam from LED 160 and lens 162 is directed vertically upwardly onto the apex 168 so that the reflector 138 splits the beam into multi-directional return beams 122. This multi-directional return from the IFF unit 120 is depicted in FIG. 1, where an interrogation beam 82 is depicted arriving at the unit 120. The IFF unit 120 provides multi-directional identification response beams 120, one of which returns along the line from which the interrogation beam 82 arrived.

Consequently, a user of a night vision device which has interrogated the user 10 would receive an identification response, and would hear an identification beep or see an identifying LED flash to identify the user 10 as a "friendly" person. As is indicated with input arrow 156', the encoder 156 can be set to transmit a selected identification code. Consequently, the user of the IFF unit 120 can set the unit to match selected identification codes assigned to friendly personnel. Alternatively, various units or groups of friendly personnel can be assigned different identification codes, with the decoders 116 of the night vision devices 32 being preset to identify all of these codes and to give differing identification responses dependent upon the group to which an interrogated individual belongs. In this way, not only can friendly personnel be identified so that injuries and fatalities from friendly fire are substantially eliminated, but command personnel can visually track the movements and identities of personnel in various groups who together are participating is an activity.

Further viewing FIG. 6, it is seen that a voltage sensing circuit 164 is connected to the output of the batteries 148 and 150. This voltage sensing circuit 164 provides intermittent power to the shaker device 166 in the event that battery power available to the IFF unit 120 drops below a certain level. Consequently, the user 10 would feel the unit 120 begin to intermittently shake the helmet 14 so that the user 10 would know that battery 148 must soon be replaced. This activation of shaker 166 is provided at a time when the IFF unit 120 still has a sufficient battery power level and remaining interval of operation to ensure a period of continued safe operation in the use environment. The operator 10 will simply find a sheltered location in which the battery 148 can be replaced, or leave the immediate area of possibly hostile activity.

While the present invention has been depicted, described, and is defined by reference to particularly preferred embodiments of the invention, such reference does not imply a limitation on the invention, and no such limitation is to be inferred. The invention is capable of considerable modification, alteration, and equivalents in form and function, as will occur to those ordinarily skilled in the pertinent arts. For example, while the present invention has been depicted and described in the context of a night vision device, it is also capable of incorporation into night sights. These night sights are generally a species of night vision device which additionally include provision both of an aiming reticle and also for mounting of the sight to a weapon. With such a provision in a night sight, a gunner can interrogate a prospective target and avoid firing if a friendly identification signal is received in response. Also, the IFF unit is disclosed and depicted in the context of its carriage upon an individual. In this use, the IFF unit would serve to identify the individual to interrogating personnel as a "friendly", who was not to be fired upon. However, the same or similar IFF units can be carried upon vehicles to provide similar protection to the vehicle and personnel therein. For example, one or more IFF units mounted upon the outside of an armored personnel carrier or other such vehicle could serve to notify interrogating gunners that the vehicle and its contents of personnel were friendly. This identification of vehicles can be especially important in situations of decreased visibility because of smoke or dust, and in situations where friendly and hostile vehicles have similar silhouette. Frequently, gunners have only a few fleeting moments in which to make a firing decision. However, with the present invention, gunners who are tempted to fire upon a vehicle because of its silhouette can interrogate the vehicle and avoid firing when an authentic identification code is received. The selective input capability of the present invention allows authentic identification codes to be changed frequently, and prevents hostile personnel from very long being able to masquerade as friendly even if they are able to obtain an authentic identification code. The depicted and described preferred embodiments of the invention are exemplary only, and are not exhaustive of the scope of the invention. Consequently, the invention is intended to be limited only by the spirit and scope of the appended claims, giving full cognizance to equivalents in all respects.

I claim:

1. A night vision device for receiving non-image information from a source in a night-time scene, said night vision device comprising:

an image intensifier having a field of view and receiving low-level light from said night-time scene, said image intensifier providing to a user of said night vision device a visible image replicating the night-time scene including said source while in said field of view;

receiver means for receiving a light beam carrying non-image information from said source while within said field of view, and for responsively providing an output response to said user.

2. The night vision device of claim 1 wherein said receiver means includes means for recovering audio non-image information from the light beam; said means for recovering said audio non-image information from the light beam including a unit selected from the group including: audio demodulators, audio digital decoders, and equivalents thereto; and said night vision device includes an audio output transducer for providing the audio non-image information in audible form to a user of the night vision device.

3. The night vision device of claim 1 wherein said receiver means includes a detector for receiving the light beam and providing an electrical response including the non-image information.

4. The night vision device of claim 3 wherein said detector includes an image intensifier tube of said night vision device.

5. The night vision device of claim 1 wherein said receiver means includes a detector for receiving the light beam and providing an output response indicative of a predetermined encoded signal on said light beam.

6. The night vision device of claim 5 wherein said output response includes a identification friend-or-foe (IFF) signal provided to said user of said night vision device.

7. The night vision device of claim 6 wherein said IFF signal includes an auditory output from said night vision device to the user of the device.

8. A night vision device comprising:

an image intensifier for receiving low-level light from a scene and providing a visible image replicating the scene;

receiver means for receiving a light beam carrying non-image information, and for providing an output response thereto;

wherein said receiver means includes a detector for receiving the light beam and providing an output response indicative of a predetermined encoded signal on said light beam, and said output response includes a identification friend-or-foe (IFF) signal provided to said user of said night vision device; and wherein said IFF signal includes a visible light signal provided to the user of the device along with the replica image of the scene viewed through the device.

9. The night vision device of claim 8 wherein said night vision device includes an eyepiece into which the user peers to see the visible image replicating the scene, the night vision device including a light emitting diode visible through said eyepiece along with said scene, and means for illuminating said light emitting diode in response to said IFF signal.

10. The night vision device of claim 1 further including means for forwardly transmitting an invisible infrared beam from said night vision device, which invisible infrared beam is encoded or modulated with a speech audio signal from the user of the night vision device.

11. The night vision device of claim 10 wherein said means for forwardly transmitting an invisible infrared beam from said night vision device includes a microphone for receiving speech audio from the user of the night vision device and providing an electrical speech signal; an amplifier receiving the electrical speech signal and providing an amplified electrical speech signal; a unit selected from the group including: audio modulators, digital audio encoders, and equivalents thereof; said unit receiving said amplified speech signal and providing a modulated or encoded signal in response thereto, a light beam generator for providing an invisible infrared light beam, and a driver for said light beam generator receiving said modulated or encoded signal and driving said light beam generator to modulate or encode said signal on said invisible infrared light beam.

12. The night vision device of claim 10 wherein said means for forwardly transmitting an invisible infrared beam from said night vision device further includes input means for receiving an interrogation command from the user of said night vision device, a unit selected from the group including: tone modulators, digital encoders, and equivalents thereof for providing said interrogation command and responsively providing a modulated or encoded interrogation signal, a light beam generator for providing an invisible infrared light beam, and a driver for said light beam generator receiving said modulated or encoded interrogation signal and driving said light beam generator to modulate or encode said interrogation signal on said invisible infrared light beam.

13. A night vision device having a field of view and providing to a user of said device a visible-light image replicating a portion of said night-time scene within said field of view, said night vision device also having the capability to covertly identify personnel made visible in said night-time scene as friend or foe by selective emission of an interrogation signal, and in response to a non-image light-beam return identification signal from friendly personnel in said field of view providing a sensible output response to the user, said night vision device comprising:

an image intensifier for receiving low-level light from a night-time scene in said field of view and providing a visible image replicating the scene, said visible image rendering personnel in said field of view visible;

means for transmitting an invisible infrared beam from said night vision device into said field of view toward said visible personnel, input means for receiving an interrogation command from the user of said night vision device and transmitting said interrogation command on said invisible infrared beam;

receiver means for receiving a light-beam return identification signal carrying non-image identification information from friendly personnel in said field of view, and means responsive to said non-image identification information for providing an output response to said user.

14. The night vision device of claim 13 wherein said receiver means further includes means for recovering audio information from said light-beam return identification signal; and said night vision device including an audio output transducer for providing the audio non-image information in audible form to said user of the night vision device.

15. The night vision device of claim 13 wherein said receiver means includes an image intensifier tube of said night vision device, said image intensifier tube providing said visible image to said user, and said image intensifier tube also providing an electrical response analogous to said non-image identification information.

16. The night vision device of claim 13 further including means for providing to said user a visible-light signal in response to said non-image identification information, which visible-light signal is provided to the user of said night vision device along with said visible image of the night-time scene.

17. The night vision device of claim 16 wherein said night vision device includes an eyepiece into which the user peers to see the visible image replicating the night-time scene, said means for providing said visible-light signal including a light-emitting diode visible through said eyepiece along with said visible image, and means for illuminating said light-emitting diode in response to said non-image identification information.

* * * * *